April 4, 1939.  J. L. HARDY  2,153,465

FLEXIBLE TRANSMISSION COUPLING

Filed Oct. 11, 1938

Inventor
John Leslie Hardy
by Mawhinney & Mawhinney
Attorneys.

Patented Apr. 4, 1939

2,153,465

UNITED STATES PATENT OFFICE 2,153,465

FLEXIBLE TRANSMISSION COUPLING

John Leslie Hardy, Birmingham, England, assignor to Hardy, Spicer & Co. Limited, Birmingham, England Application October 11, 1938, Serial No. 234,473
In Great Britain August 26, 1938

6 Claims. (Cl. 64—11)

This invention relates to coupling members, for flexibly coupling together substantially coaxial shafts or other elements, and particularly to such as are to be used in the drives of motor-vehicles, of the kind which is to be rigidly attached to one of the elements and in housings in which are secured three flexible bushes in the bores of which are secured pins to be attached to the other element. The pins are substantially parallel to and equally angularly spaced from one another about the main axis of the coupling member.

The main object is to provide an improved coupling member of this kind possessing advantages over known constructions.

According to the main feature of the invention the coupling member is built up of three similar units each of which incorporates one of the housings in which one of the flexible bushes is secured, with one of the pins secured in its bore, whilst the housing has lugs which extend from opposite sides and are adapted to be bolted or otherwise detachably secured to one another with the pins as aforesaid. Conveniently each unit includes a metal segment-shaped member at the centre of which is the housing, this being of cylindrical form with its main axis at right-angles to the side portions, which latter constitute the lugs.

The bushes are preferably of rubber or rubberised material, having in their end faces grooves coaxial with their bores in a manner known per se, and are secured to the associated pins, which are conveniently in the form of metal bushes) and the housings by vulcanisation.

Figure 1:
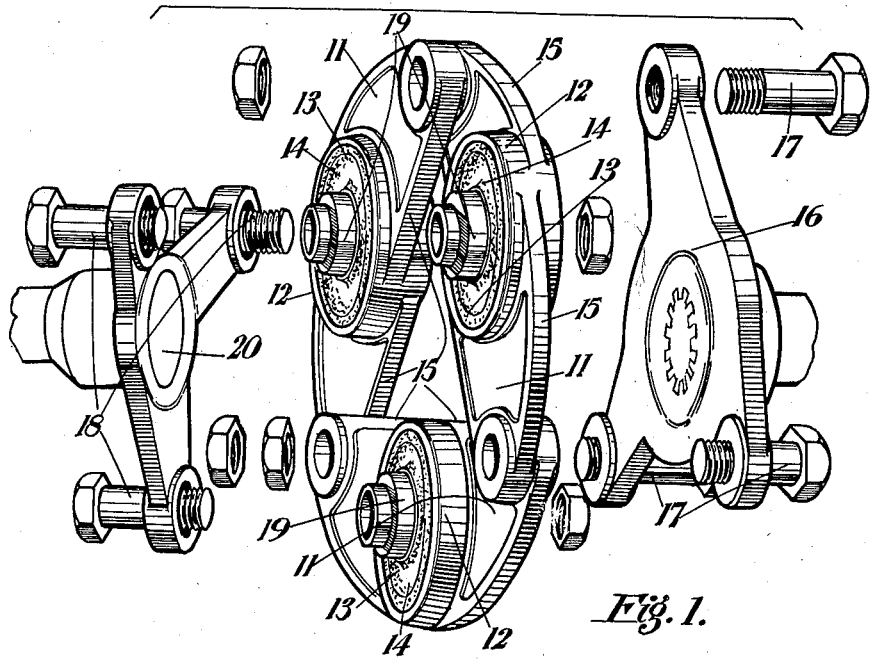
Figure 2:
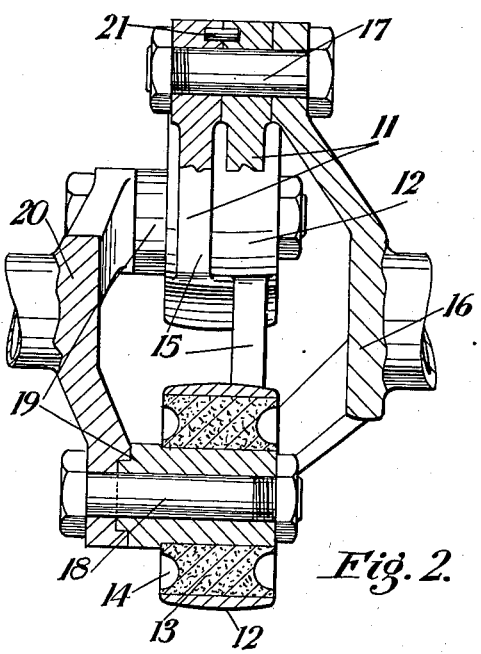

In the accompanying drawing:

Figure 1 is a perspective view, with the parts detached, of one form of coupling member according to the invention; and Figure 2 is a cross-section through the coupling member when assembled.

In the construction illustrated the coupling member is assumed to be carried by the tail shaft of the gear-box of a motor-vehicle having a long wheelbase chassis and a propeller shaft assembly incorporating three joints, of which one is that carried by the tail shaft.

The main portion of each unit (the three units, as stated, all being similar) is a segment 11 preferably formed as a steel forging and having a central cylindrical housing 12, in which is vulcanized a rubber bush 13 having a groove 14 in each end face coaxial with the bore, and lugs 15, on opposite sides of the housing, for attachment to lugs of adjacent segments and to the driving element 16 by means of through bolts 17. By offsetting the lugs of each segment on opposite sides of a central plane the axes of the three housings can be maintained parallel to the main axis of the assembly when the ends of the lugs are brought into overlapping relationship, as shown, and by the attachment of the complete assembly direct to the rigidly-supported driving element by the same bolts which interconnect the segments the built-up coupling member is rigidly attached to the driving element at three points, thus maintaining perfect concentricity.

The driven element 20 is attached by means of bolts 18 extending through the tubular metal pins 19 which are vulcanized to the bores of the rubber bushes. The axes of the driven pins 19 are at a less radius of the coupling than are the axes of the driving bolts 17. 21 represents dowels for location purposes during assembly.

By rigidly attaching the built-up coupling member to the rigidly-supported driving element only, the smaller floating mass is associated with the driven element. In this way the natural tendency of a rubber-bush-type of coupling to run off centre and develop irregularities is considerably reduced by the naturally rigid properties of the three-point driving connection.

The three segments being identical in shape are all interchangeable, and it is therefore possible to maintain replacement requirements at a minimum, one standard piece being available to replace any of six segments in, say, a propeller shaft assembly incorporating such a coupling member at either end.

Also by virtue of the mode of assembly any segment of the coupling member can be removed and replaced by the withdrawal of three bolts only, leaving the remainder of the assembly in situ, an advantage which, it is believed, is not obtainable in any flexible coupling other than that described in the specification of co-pending British patent application No. 14,155/38.

For use where no great degree of angularity or misalignment is present, this three-bush type of transmission coupling possesses distinct advantages over that of the application aforesaid, for whilst in the former type of coupling the same volume of rubber and the same area of rubber for vulcanizing to the housings can be employed as in the latter to give a similar performance, the former, as will readily be understood, can be of considerably smaller overall diameter, whereby a considerable saving in weight is effected.

What I claim as my invention and desire to secure by Letters Patent of the United States is:

1. In a flexible transmission coupling between two elements, a coupling member, to be rigidly attached to one of the elements, built up of similar segments each consisting of a housing having lugs extending from opposite sides, said lugs adapted to be detachably secured to one another, flexible bushes secured in said housings, and pins secured in the bores of said bushes, said pins to be attached to the other element.

2. In a flexible transmission coupling between two elements, three similar segments each consisting of a housing having lugs extending from opposite sides, flexible bushes secured in said housings, pins secured in the bores of said bushes, said pins to be attached to one of the elements, and bolts passing through holes in said lugs and serving for detachably securing said segments together and to the other of the elements.

3. In a flexible transmission coupling between two elements, three similar segments each consisting of a housing having lugs extending from opposite sides, flexible bushes secured in said housings, pins secured in the bores of said bushes, said pins to be attached to one of the elements, and bolts passing through holes in said lugs and serving for detachably securing said segments together and to the other of the elements, said pins and bolts being parallel to one another and said bolts at a greater radius than said pins.

4. In a flexible transmission coupling between two elements, a coupling member, to be rigidly attached to one of the elements, built up of similar segments each consisting of a housing having lugs extending from opposite sides, the lugs of a segment being offset on opposite sides of a central plane through the segment.

5. In combination with substantially parallel driving and driven shafts, a coupling member rigidly attached to the driving shaft, said member built up of three similar segments detachably secured to one another, each segment having a cylindrical housing therein and lugs extending from opposite sides thereof, said lugs serving for the detachable securing of said segments together with the axes of said housings parallel to one another and equally angularly-spaced about the main axis of the coupling member, rubber bushes secured in said housings by vulcanization, tubular pins vulcanized in the bores of said bushes, and means securing said pins to the driven shaft.

6. The combination of claim 5, the shafts carrying three-armed spiders, one rigidly attached to the coupling member and the other to said pins.

JOHN L. HARDY.